United States Patent [19]

Shell

[11] Patent Number: 5,230,295
[45] Date of Patent: Jul. 27, 1993

[54] COMBINATION EYE HOOK AND MODIFIED CLEAT, PARTICULARLY FOR CARGO TIE-DOWN

[76] Inventor: David A. Shell, 500 Rancheros Dr. #110, San Marcos, Calif. 92069

[21] Appl. No.: 879,100

[22] Filed: May 4, 1992

Related U.S. Application Data

[63] Continuation of Ser. No. 686,050, Apr. 16, 1991, abandoned.

[51] Int. Cl.⁵ .............................................. F16G 11/10
[52] U.S. Cl. ................................. 114/218; 24/129 R
[58] Field of Search ............... 114/218, 381; 128/356; 24/129 A, 129 R, 130, 136 K, 115 K, 265 LD

[56] References Cited

U.S. PATENT DOCUMENTS

| | | | |
|---|---|---|---|
| 2,649,069 | 8/1953 | Halpine | 114/218 |
| 3,715,782 | 2/1973 | Hewell | 24/129 R |
| 3,948,203 | 4/1976 | Matthews | 114/218 |
| 4,361,938 | 12/1982 | Emery | 114/218 |
| 4,690,090 | 9/1987 | Tuttle | 114/218 |
| 4,910,834 | 3/1990 | Minkler | 24/129 R |

*Primary Examiner*—Joseph F. Peters, Jr.
*Assistant Examiner*—Clifford T. Bartz
*Attorney, Agent, or Firm*—Frank D. Gilliam

[57] ABSTRACT

A generally elongate fitting has, at a distal end, a hook for hooking an external object, and, at a proximal end, an eye and a cleat for attaching a rope. An eye hook with an eye at its proximal end, a hook at its distal end, and a connecting shank between the hook and the eye is formed integrally with a modified cleat that has both (i) a pair of projecting arms and (ii) a projecting arm. The pair of projecting arms extends proximally from the region of the eye so as to form a "V" channel between them. The projecting arm extends distally from the region of the eye at an incline to the shank so as to form another "V" channel. Both channels are suitable to compressively engage a rope that is forcibly wedged within such channel. A rope slipped through the eye is pulled taught against the eye, and not against either channel, until, a desired tension in the rope having been achieved, the rope is easily, while still held taut, angled into that channel of the cleat which is formed between the two projecting arms. The rope is then pulled tight into the remaining channel, and rethreaded through the eye in an opposite direction. The connection so achieved is both strong and secure despite being easy and extremely quick. A normal connection is typically stronger than the tensile strength of the rope that is connected.

10 Claims, 2 Drawing Sheets

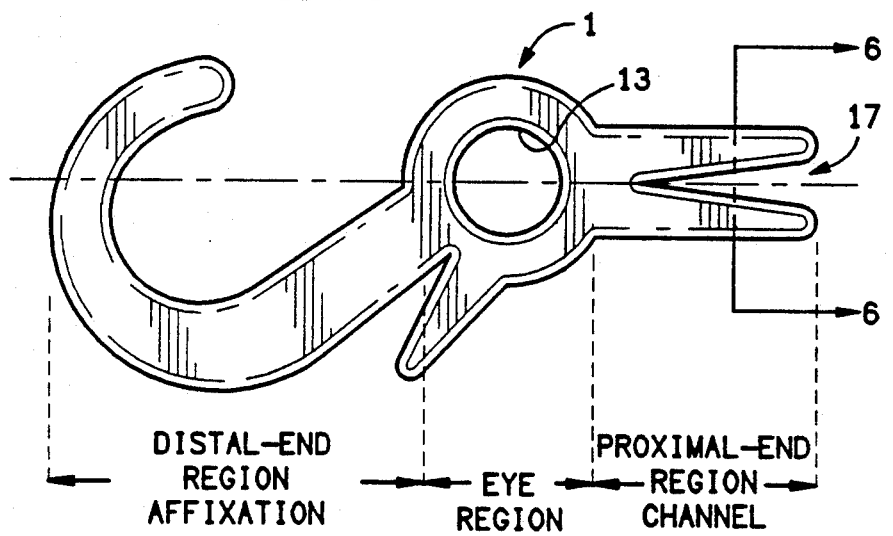
FIG. 5
FIG. 6
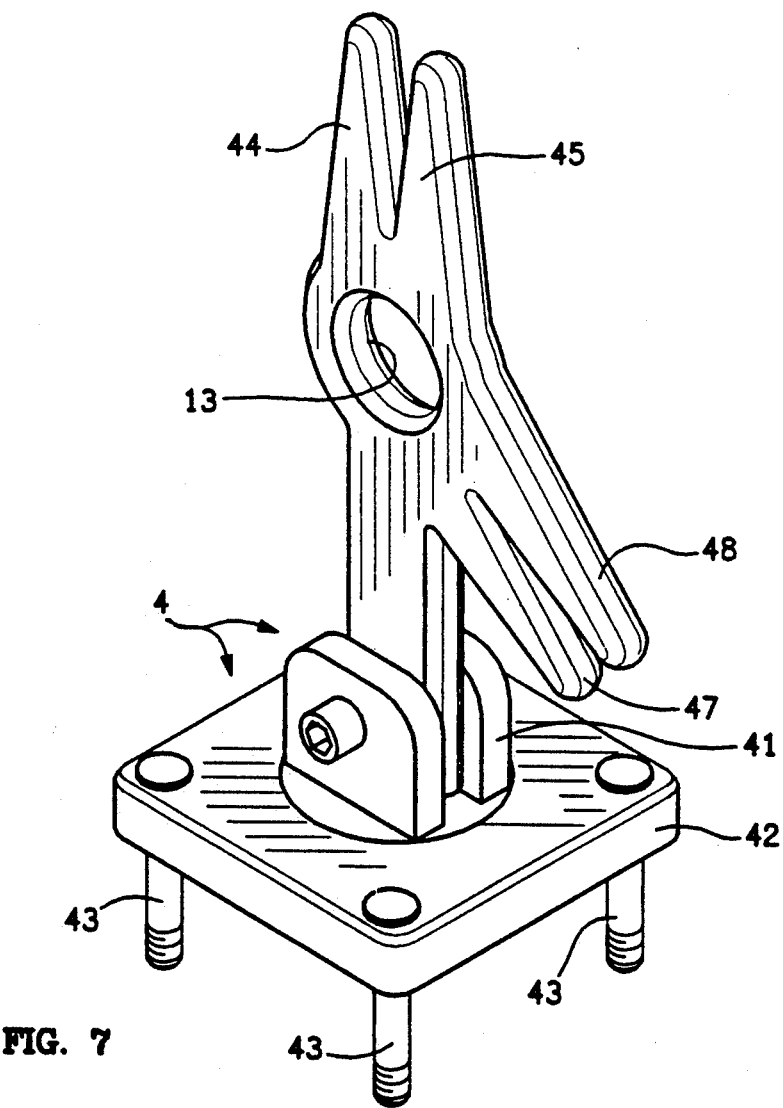
FIG. 7

COMBINATION EYE HOOK AND MODIFIED CLEAT, PARTICULARLY FOR CARGO TIE-DOWN

This application is a continuation of application Ser. No. 07/686,050, filed Apr. 16, 1991 now abandoned

BACKGROUND OF THE INVENTION

1. Field of the Invention

The present invention generally concerns a fitting for the fastening or lashing of ropes in order to secure cargo or freight or the like in or on trucks, aircraft, ships, railroad cars, or other vehicles and vessels. The present invention particularly concerns a fitting made from metal or strong synthetic material, and having characteristics of both an eye bolt and a cleat used synergistically so as to permit the effective (i) tightening, and (ii) securing, of ropes by hand.

2. Background of the Invention

Numerous devices and methods are known for fastening or securing ropes, lines, chains, or other flexible linear members in order to secure cargo and freight to the beds, floors, or decks of vehicles, ships, and aircraft. These devices and methods are of varying effectiveness in (i) weight, (ii) speed of attachment, (iii) ease of attachment, (iv) tightness, or force, of attachment, (v) security of attachment, and against loosening, including attachment security during changes in spatial position and/or applied forces, (vi) strength, and/or (vii) cost. Often devices or methods that excel in one area prove mediocre, or deficient, in other areas.

A classic fitting for the securing of ropes or lines is a cleat, such as is typically abundantly used in the upperworks of the rigging of a sailboat. A cleat is strongly permanently attached to a surface such as a deck: a cleat is not used suspended in space such as by any attachment to ropes or lines. A cleat typically has a base which is mounted to a surface, a central support member extending perpendicularly from a central region of the base, and an elongate supported member extending from central support member in a plane parallel to the plane of the base and also to the surface to which the base is mounted. Normally the base, the support member and the supported member are integral, and are typically cast from strong metal. The cleat forms two "U"-shaped channels between its base and its supported member at both of two opposite sides of the support member. Ropes may be pulled smoothly through these channels, pulled tight, and then wrapped in the form of various knots, or ties, around both the support member and the supported member to secure the taut rope to the cleat.

A cleat is sufficiently effective so as to have endured in common use for hundreds of years, and millions of replications. It should be understood, however, that a cleat is generally limited to use in the securing of ropes to a surface. Moreover, attachment of ropes to a cleat requires some modest skill, or intelligence, on the part of a user. The user must properly pull tight the rope(s), and tie the knot(s), in order to correctly, and adequately, both (i) tension, and (ii) secure, the rope(s) to the cleat.

Meanwhile, an equally common, and classic, fitting is the eye hook. The eye hook is intended, unlike the cleat, for use in free space. An eye hook is normally fabricated as a unitary device having (i) a cable, or rope, terminal eye for engaging one or more cables or ropes, integrally connected to (ii) an oppositely disposed hook for engaging another eye or other object that is either fixed to a floor, deck, or other support (which is not necessarily planar), or which is itself held in space by further cables or ropes.

Cleats and eye hooks have each been combined with other fittings, and with each other. U.S. Pat. No. 3,747,554 for a COMBINATION CHOCK AND FAIRLEAD FITTING shows a recessed chock (cleat) in combination with a fairlead passage, particularly for use on boats. U.S. Pat. No. 1,328,985 for a CLEAT shows a cleat that is secured to the edge of a planar surface by a screw clamp. U.S. Pat. No. 3,291,094 for a CLEAT DEVICE FOR WATER BORNE VESSEL and U.S. Pat. No. 3,905,322 for a BOAT MOORING CLEAT each show specialized cleats adapted for nautical use. U.S. Pat. No. 2,649,069 for a BITT-CHOCK shows a specially-configured double cleat for locking an intertwined rope. U.S. Pat. No. 3,948,203 for a MULTIPLE POINT SECURING CLEAT show a cleat that incorporates a terminal eye.

Particular previous combinations of an eye hook and a cleat, as is the subject of the present invention, are shown in U.S. Pat. No. 622,084 for a HAME FASTENER, and in U.S. Pat. No. 2,386,836 for a CARGO TIE-DOWN FITTING. In the hame fastener the "eye" of the eye hook is replaced by a dovetail socket that receives and holds a loop end of a tie rope. The hame fastener mounts a cleat to the body of the eye hook (actually a hook and a dovetail groove) at that side of the eye hook toward which its hook opens. Conversely, the tie-down fitting mounts a cleat upon a side of the eye hook opposite to that side toward which its hook opens. However, in both the hame fastener and the cargo tie-down fitting the cleat is located in a position intermediary between the eye hook's "eye" and its hook.

In operation of both the previous name fastener and the previous cargo tie-down fitting a rope is looped through one of two channels formed between the two guide-lugs of the cleat and the body of the eye hook to which the cleat is affixed. The rope is then pulled taught, passed through the remaining channel, and tied to or looped about the cleat in a substantially normal manner. According to this manner of intended use, at least the first one, and normally both, of the channels formed between the guide lugs of the cleat, and the body of the eye hook to which the cleat is affixed, are sufficiently "U"-shaped so as to be capable of slipping a rope that passes therethrough in order to tighten the rope. To repeat, the channels of the previous fittings combining an eye hook with a cleat must be "U"-shaped, in the manner of a conventional cleat, because rope must slide within such channels. Meanwhile that the cleat is independently used to secure the rope, in the substantial manner of all cleats, the eye hook essentially performs a related, but independent, fastening function.

The present invention will be seen to be based on a better, and more compatible, integration of the function, and structure, of both an eye hook and a cleat. Such an improved integration will promote, among other advantages, a simple and fast, virtually fool-proof, secure fastening of ropes such as are commonly used to secure cargo or the like in diverse applications.

SUMMARY OF THE INVENTION

The present invention is based on the realization that, within a fitting comprising a combination eye hook and cleat, (i) a pulling on a rope in order to tighten such rope is best done when the rope is slipped through, and pulled against, the eye of the eye hook, and neither through nor against a channel of the cleat, while (ii) a rope so pulled taut can easily and reliably be secured if at least one, and preferably both, of the channels that are formed between the guide lugs of the cleat and the body of the eye hook are "V"-shaped, and constricted, as opposed to being "U"-shaped, and open.

The present invention is embodied in a generally elongate fitting having, at a distal end, a hook for hooking an external object, and, at a proximal end, an eye and a cleat for attaching a rope. The fitting includes, as a first part, an eye hook with an eye at its proximal end, a hook at its distal end, and a connecting shank between the hook and the eye. The fitting further includes, as a second part, a modified cleat that has both (i) a projecting arm and (ii) a pair of projecting arms.

In accordance with a first aspect of the present invention, the modified cleat is affixed to the eye hook (i) in a position proximate to the eye hook's eye (ii) with the pair of projecting arms extending proximally from the region of the eye, meaning in a direction opposite to the direction of the distal end hook. Both the position and the direction of this affixation are very significant: the affixation (i) location and (ii) orientation jointly permit that a rope slipped through the eye may be pulled taught against the eye, and not against the channel of the cleat.

In accordance with a second aspect of the present invention, the cleat's pair of projecting arms form a channel between them which channel narrows towards an apex. Because of this narrowing the channel is particularly suitable to compressively engage a rope as that is forcibly wedged within such channel.

When both the first and the second aspects of the invention are used in combination a rope may first be slipped through the eye of the fitting and pulled tight. Then, a desired tension in the rope having been achieved, the rope may easily be, while still held taut, angled into the "V"-shaped channel of the cleat which is formed between the two projecting arms. The taut rope will wedge within such "V"-shaped channel, and will immediately subsequently be held and secured.

The use of the combination eye hook and modified cleat in accordance with the present invention to this point is very fast, simple, and natural. There is no reasonable way to attempt to use the fitting save in the manner just described. Nonetheless to the ease, and rapidity, with which an initial connection is made, this initial connection is typically very strong, and on the order of hundreds of pounds yielding force.

Still further in accordance with the present invention the cleat's remaining projecting arm extends (i) from the region of the eye, and (ii) at an incline to the shank. A channel is thus formed between the arm of the modified cleat and the shank of the eye hook. This channel also narrows towards an apex, and is, because of such narrowing, also suitable to compressively engage a rope that is forcibly wedged within such channel.

It is because at least one, and preferably both, of the cleat's channels are "V"-shaped, as opposed to the more normal "U"-shape, that the cleat is spoken of as being "modified". Indeed, the "V"-shaped channels of the fitting of the present invention may usefully be surfaced with serrations or other rough features which promote the frictional retention of ropes that are pulled snug within the channels. This is, of course, opposite to a standard cleat which promotes the smooth sliding of ropes or lines through its "U"-shaped channels.

In accordance with still another aspect of the present invention, an imaginary line bisecting the acute angle of the "V" which is formed between the cleat's pair of distally-extending arms will intersect the interior arcuate surface of the hook at a location upon, and along, such surface where an external object is normally hooked during operational use of the fitting. This alignment best establishes that the line of force between a rope and an object to which the fitting is hooked bisects the proximal channel of the fitting. The rope itself (which is connected through the eye of the fitting) will pass directly over the top of this proximal channel as well as, having been looped and bent through 270°, passing perpendicularly through this channel. The rope which the fitting serves to connect thus lies against itself, and at an approximate 90° angle, where it passes through the proximal channel. The resultant frictional contact of the rope against itself operates like a knot even though, strictly speaking, no knot is topologically tied during a wrapping of the rope about the cleat.

According to the excellent frictional contact that a rope secured by the fitting of the present invention makes both (i) with the fitting, particularly at the locations of the fitting's two "V"-shaped channels, and (ii) with itself, the strength and reliability of the final connection so established is reliable and strong. Nonetheless that a connection of a rope by the fitting of the present invention is both strong and secure, it is also very easy and extremely quick. It is effectively impossible to perform an improper or unsatisfactory connection by use of the fitting because a cinching of the rope through but a single one of the cleats two channels typically provides an impressively strong retention force—often exceeding the strength of the rope itself. A normal correct and final connection, which can be realized in just a few seconds, is typically stronger than the tensile strength of the rope that is connected, and is typically in the order of many hundreds of pounds yield force.

BRIEF DESCRIPTION OF THE DRAWINGS

FIG. 4 is a table showing the results of testing the fitting in accordance with the present invention as constructed from different materials, and as secured in the manners shown in FIG. 1 and in FIG. 2.

DESCRIPTION OF THE PREFERRED EMBODIMENT

Figure 1:
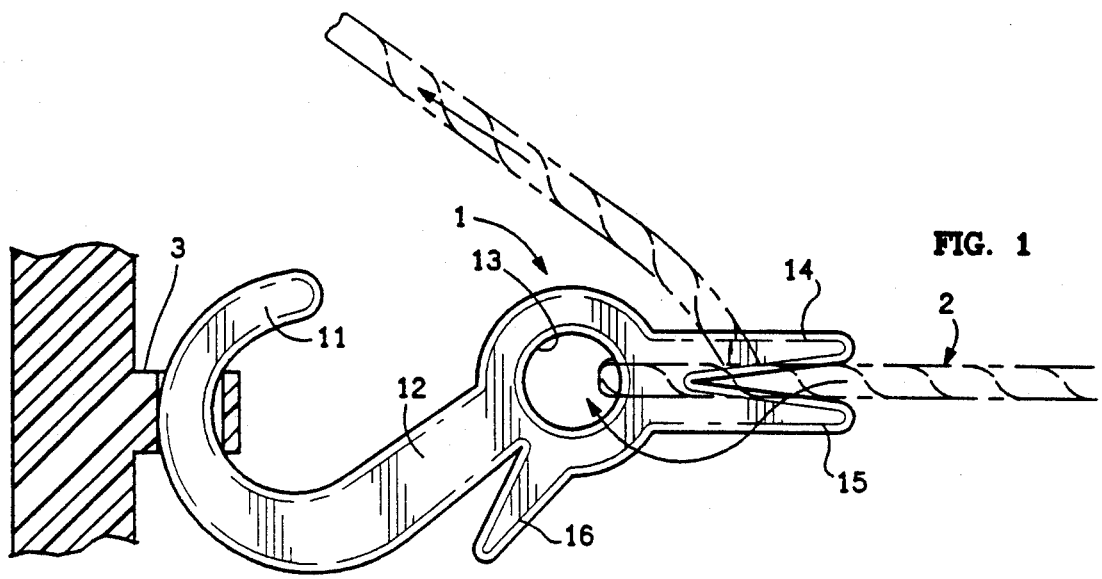
FIG. 1 is a diagrammatic view showing a preferred embodiment of a fitting in accordance with the present invention positioned and aligned for connecting a rope to an external object, and particularly showing how the rope may be (i) pulled tight, and then (ii) cinched.
Figure 2:
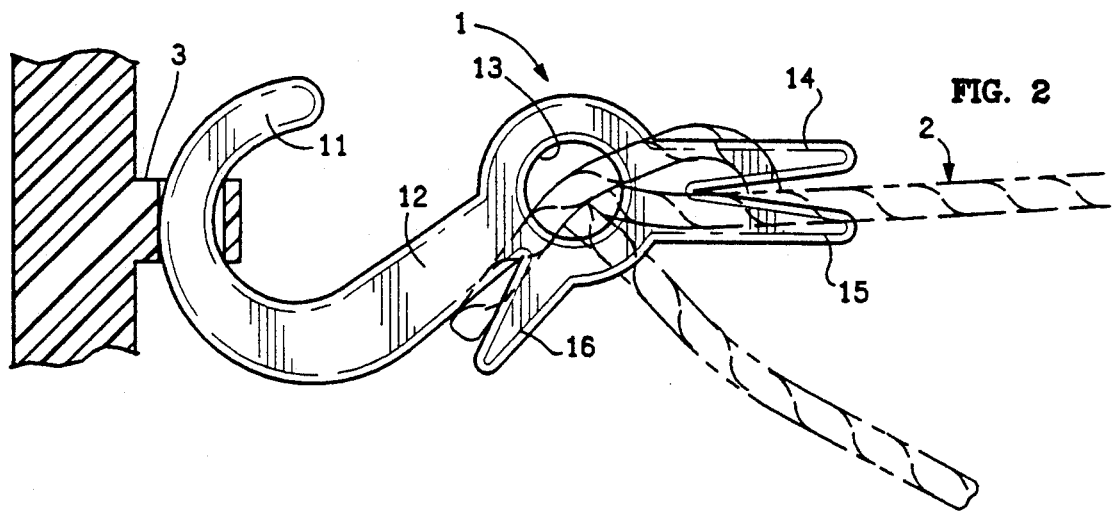
FIG. 2 is a diagrammatic view of a preferred connection made with the preferred embodiment of the fitting in accordance with the present invention.
Figure 3:
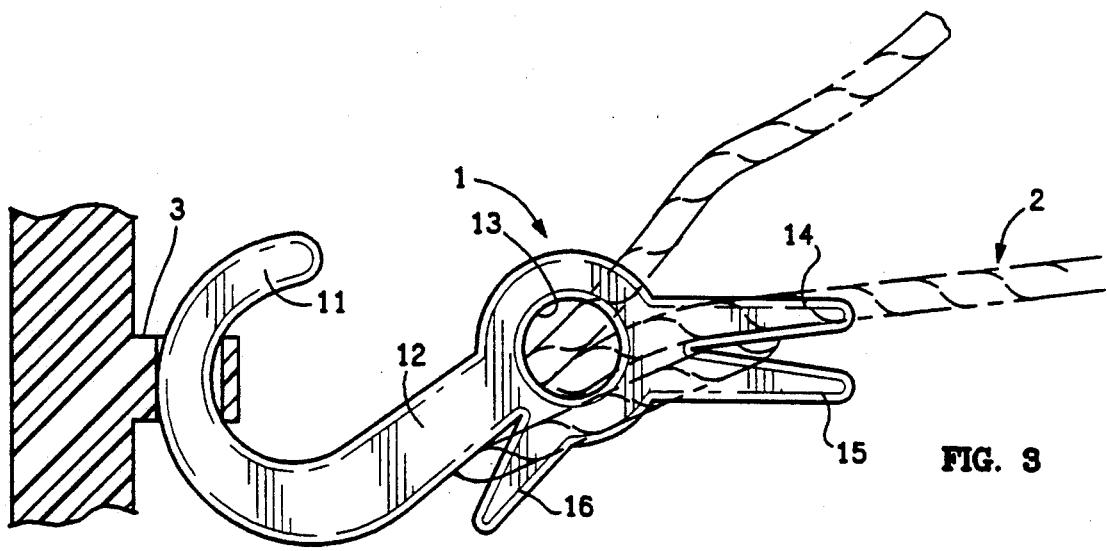
FIG. 3 is a diagrammatic view of an alternative connection made by use of the preferred embodiment of the fitting in accordance with the present invention.

A preferred embodiment of a combination eye hook and modified cleat fitting 1 in accordance with the present invention is shown in diagrammatic view in FIGS. 1-3. The fitting 1 connects at its distal end to a rope 2, or a cable or a chain or the like, and at its proximal end to a tie-down fitting 3, or a shackle or an eye terminal or a hook or the like. Both the rope 2 and the tie-down fitting 3 are shown in phantom line for not being a part of the present invention that is embodied in fitting 1. The rope 2 commonly extends over cargo or freight or other heavy items in order to lash such items to the bed or floor or deck of a vehicle, ship, aircraft, or other transport vehicle. The tie-down fitting 3 is nominally of a type common in the beds or floors or decks of vehicles, ships, and aircraft, and is strongly permanently attached to the frame of such vehicles, ships, or aircraft. Fitting 1 is not limited in use to transportation applications, but may readily be employed wherever hooks or cleats are commonly individually employed in order to secure ropes or lines to other objects, whether mobile or stationary.

The fitting 1 is commonly constructed of metal or else a strong composite material, typically either plastic or nylon. For long life, high strength, low cost, and resistance to corrosion in transportation applications, molded nylon that is variously 14% or 30% glass-filled is preferred for most normal light to heavy duty applications. The size of the fitting 1 is dependent upon the size of the rope 2 and the tie-down fitting 3 that it engages. A typical fitting 1 for use with ⅜ inch diameter synthetic or natural fiber rope is on the order of 5 inches by 2¼ inches in its maximum dimensions. The fitting 1 scales up or down from this size without appreciable detriment to its operative characteristics such as will be discussed. Accordingly, the principles of the present invention that are embodied in the fitting 1 will be understood to be substantially independent of any particular area of intended use of the fitting 1.

The fitting 1 has and presents a distal end hook 11 connecting through a shank 12 to an eye 13. The elements 11-13 constitute a standard eye hook.

Both a pair of extending arms 14,15 and a single extending arm 16 are integral with the eye hook in a position proximate its eye 13, and extend outward so as to form a cleat. More particularly, the pair of extending arms 14,15 extend proximally from the region of the eye 13, meaning in a direction opposite to the direction of the distal end hook 11. Meanwhile, the cleat's single projecting arm 16 extends at an incline to the shank 16, and typically from an side of such shank 16 that joins to the exterior bend radius of the hook 11, and that is thus opposite to that side of shank 12 that joins to the interior bend radius of the hook 11. Notably, the single projecting arm 11 need not be on that side of the shank 12 whereat it is illustrated in FIGS. 1-3 but could, instead, be at that side of the shank 12 that joins to the interior bend radius of the hook 11.

The important principles of the invention are not merely that a cleat or cleat-like structure should be used in proximity to, and together with, an eye hook, but exactly how these two structures are integrated, and modified, so as to best support the intended tie-down function of fitting 1.

In accordance with the principles of the invention, two channels are formed; one between the pair of projecting arms, and one between the arm of the modified cleat and the shank of the eye hook. Each channel also narrows towards an apex, and is, because of such narrowing, also suitable to compressively engage a rope that is forcibly wedged within such channel.

In particular, the cleat's pair of projecting arms 14,15 form a channel between them which channel narrows towards an apex. Because of this narrowing the channel is particularly suitable to compressively engage the rope 2 when it is forcibly wedged within such channel.

Another channel is also formed between the arm 16 of the modified cleat and the shank 12 of the eye hook. Preferably this channel also narrows towards an apex, and is, because of such narrowing, also suitable to compressively engage the rope 2 when such rope 2 is forcibly wedged within such channel. Both channels may be properly described as "V"-shaped, as opposed to the more common "U"-shaped channels of a common cleat.

It is because at least one, and preferably both, of the channels of the fitting 1 are "V"-shaped, as opposed to the more normal "U"-shape, that the cleat portion of the fitting 1 is spoken of as being "modified". Indeed, the "V"-shaped channels may be surfaced with serrations or other rough features 17 which promote the frictional retention of a rope 1 when such rope 1 is pulled snug within the channels. Serrations 17 may be provided on one side of a channel, as shown on shank 12, or both sides, as shown on arms 14 and 16 in the Figures.

The position and the direction of the affixation of the pair of projecting arms 1 to the eye hook portion of the fitting 1 operate synergistically with the modified, "V"-shaped, nature of the channels. The (i) location and (ii) orientation of the pair of arms 14,15, in combination with the "V"-shaped channel created between such arms 14,15, jointly permit that a rope 2 slipped through the eye 13 may be pulled taught against the eye 13, and not against the channel of the cleat, until, a desired tension in the rope 2 having been achieved, the rope 2 may quite easily and quickly be, while still held taut, angled into the "V" channel of the cleat which is formed between the two projecting arms 14,15. The rope 2 is subsequently held and secured within such "V" channel to a remarkable degree.

This intermediary step in connecting the rope 2 to the fitting 1 in accordance with the present invention is shown in FIG. 1 precisely so that it may be emphasized that a connection of considerable strength has already been made, and tightly made. Especially when the flexibility and compressibility and frictional resistance of the rope 2 are suitable to the "V" channel between the arms 14,15 within which channel the rope 2 is clenched, even the rudimentary, and de minimis, connection shown in FIG. 1 may prove stronger than the rope 2 itself.

Moreover, it will be noted that an imaginary line bisecting the acute angle of the "V" which is formed between the cleat's pair of distally-extending arms 14,15 will intersect the interior arcuate surface of the hook 11 at a location upon, and along, such surface where the external tie-down fitting 3 is normally hooked during operational use of the fitting. This alignment establishes that the line of force between a rope and an object to which the fitting is hooked bisects the proximal channel of the fitting 1 between its arms 14,15. The rope 2 itself (that is connected through the eye 13 of the fitting 1) will pass directly over the top of this proximal channel as well as, having been looped and bent through 270°, passing perpendicularly through this channel. The rope 2 which the fitting serves to connect thus lies against itself, and at an approximate 90° angle, where it passes through the proximal channel. The resultant frictional contact of the rope against itself operates like a knot even though, strictly speaking, no knot is topologically tied during a wrapping of the rope about the fitting 1 (as is more completely illustrated in FIGS. 2 and 3).

The result of these carefully chosen geometries is profound: a rope that is tightened and cinched to the fitting 1 in mere seconds so as to assume the position of FIG. 1 will, nonetheless to the rapidity and ease with which it is secured, be quite reliably and strongly held. Indeed, the rudimentary connection shown in FIG. 1 is, without more, often stronger than the tensile strength of the rope 2 itself. This means that, if pulled to breakage, the rope 2 will break at a location other than its attachment to the fitting 1, and will not pull from the fitting 1.

A preferred completion of the attachment of the rope 2 to the fitting 1, and through such fitting 1 to the tie-down point 3, is diagrammatically illustrated in FIG. 2. A first alternative connection is diagrammatically illustrated in FIG. 3. As another, second, alternative (not shown) to that alternative shown in FIG. 3, the stub end of the rope 2 can be passed between the fitting 1 and that portion of the rope 2 that proceeds between the two channels. Both this second alternative connection (not shown), and the actual alternative connection shown in FIG. 3, are not as preferred as is the connection shown in FIG. 2. This is because the relative orientation of fitting 1, rope 2, and tie-down fitting 3 within the preferred connection shown in FIG. 2 produces an alignment of the rope 2 that is similar to a two half hitches knot. The connection is not, of course, a tightened knot. Nonetheless, it is obvious that even the slipperiest of ropes would not easily escape the retention of the preferred completed connection shown in FIG. 2.

Notably, the connection that is preferred—shown in FIG. 2—is the connection that is promoted by the relative positions, and alignments, of the arms 14-16 relative to the eye 13, the shank 12, and the hook 11. Mainly, the axis of the pulling force is completely determined by the time that connection has preceded so far as is shown in FIG. 1.

According to the excellent frictional contact that a rope 2 secured by the fitting 1 of the present invention makes both (i) with the fitting, particularly at the locations of the fitting's two "V"-shaped channels, and (ii) with itself, the strength and reliability of the connection so established is excellent. Nonetheless that a connection of a rope 2 by the fitting 1 of the present invention is both strong and secure, it is also very easy and extremely quick. It is effectively impossible to perform an improper or unsatisfactory connection by use of the fitting 1 because a cinching of the rope through but a single one of the two "V"-shaped channels of the fitting 1 typically provides an impressively strong retention force which often exceeds the strength of the rope 2 itself. A normal correct connection, which can be realized in just a few seconds, is typically stronger than the tensile strength of the rope 2 that is connected.

A computer simulation of stresses within the fitting under simulated loads has been performed. The regions of the tip ends of all projecting arms 14-16, and of the tip end of hook 11, are subjected to low stress, and need not be overly thick or strong. As may well be imagined, most of the stress within the fitting is concentrated in its shank 12, around the periphery of its eye 13, and between its pair of projecting arms 14,15 at their "V"-shaped union. The fitting 1 need not be of equal thickness in all regions, and may typically be made thicker and more robust in regions of highest stress forces.

Actual destructive testing of fittings in accordance with the present invention as were fabricated from different materials were conducted. The testing generally validated the computer modeling. The fittings were tied with strong rope, and loaded (pulled) in a hydraulic test fixture until failure. Failure could result either when the fitting broke or was deformed so far that if slipped off the anchor bolt (no loosing of the connected rope was experienced). The load was typically applied over a few seconds. Accordingly creep was not part of the test. The ambient temperature was maintained at 60° F.

The fittings were fastened for test in two different ways. The first way was "cinched", meaning completely tied and fastened in the preferred manner shown in FIG. 2. The second way was "looped", meaning the initial connection only such as was shown in FIG. 1. The purpose of testing the "looped" configuration was to determine the strength of the wedging effect of the rope 2 between the pair of projecting arms 14,15.

The results of the testing for selected materials are tabulated in the Table of FIG. 4. Results show that a sharp apex, or crack, between the pair of projecting arms 14,15 should be avoided because of a premature failure induced by the wedging action of the rope, at least during the "cinching" attachment and/or during construction of the fitting from more brittle materials.

When the preferred, "looped", method of retaining the fitting 1 was used failure usually occurred at the shank 12 of the hook—exactly as predicted by computer simulation. Accordingly, with due care to the radius of the apex of the fork saddle, or channel, between the pair of projecting arms 14,15 and the possible use of stress risers in this location, the fitting can be made from materials, including steel, so as to exhibit any reasonably desired strength. In accordance with the showing of FIG. 4, synthetic materials such a nylon well suffice to produce fittings with yield strengths in excess of several hundred pounds.

In accordance with the preceding explanation, various alternative embodiments of the present invention will suggest themselves to a practitioner of the mechanical design arts. For example, the hook could be replace with a threaded rod, in the manner of an eye bolt, or with another, second, eye, in the manner of a double-eyed turnbuckle. For example, either or both of the pair of arms 14,15 could be more harmoniously visually integrated into the shape of the eye hook, appearing as sort of a "pointy" proximal end region thereof. For example, the arm 16 could be moved in position—including to point alongside, or in a plane slightly skewed relative to the plane of, the pair of arms 14,15. Indeed, the arm 16 could be replace by an aperture, clamp, or any other common mechanical structure which performs its secondary holding and retention function.

According to these and other possible alterations and adaptations of the present invention, the invention should be broadly interpreted in accordance with the following claims, only, and not solely in accordance with that preferred embodiment within which the invention has been taught.

What is claimed is:

1. A generally elongate fitting for, at its one end hooking an external object, and, at its other end, attaching a rope, the fitting comprising:
 a central eye portion having an open eye extending therethrough;
 a hook having a shank secured to said central eye portion and a curved end portion, said hook extending away from said central eye portion in a first direction;
 first and second closely spaced arms secured to said central eye portion and extending therefrom in a second direction generally opposite to said first direction;

the adjacent sides of said first and second closely spaced arms forming a generally V-shaped channel with the apex extending toward said open eye; and a third arm secured to said central eye portion adjacent to said shank;

the adjacent sides of said hook shank and said third arm forming a generally V-shaped channel with the apex extending toward said open eye;

whereby said V-shaped channels are adapted to grasp a rope forcibly wedged thereinto while leaving said hook free of said rope permitting said hook to hook around an external object.

2. The fitting according to claim 1 further including serrations on said adjacent surfaces of said first and second arms, whereby the grasping of a rope wedged therebetween is further enhanced.

3. The fitting according to claim 1 further including serrations on said adjacent surfaces of said third arm and said shank, whereby the grasping of a rope wedges therebetween is further enhanced.

4. The fitting according to claim 1 wherein said third arm is located adjacent to the side of said shank opposite the direction toward which said hook curves.

5. The fitting according to claim 1 wherein said fitting is formed from nylon.

6. A generally elongate fitting for, at its one end hooking an external object, and, at its other end, attaching a rope, the fitting comprising:

a central eye portion having an open eye extending therethrough;

a hook having a shank secured to said central eye portion and a curved end portion, said hook extending away from said central eye portion in a first direction;

first and second closely spaced arms secured to said central eye portion and extending therefrom in a second direction generally opposite to said first direction;

the adjacent sides of said first and second closely spaced arms forming a generally V-shaped channel with the apex extending toward said open eye;

a third arm secured to said central eye portion adjacent to said shank;

the adjacent sides of said hook shank and said third arm forming a generally V-shaped channel with the apex extending toward said open eye; and the surface of at least one of said adjacent opposed sides being serrated;

whereby said V-shaped channels are adapted to grasp a rope forcibly wedged thereinto while leaving said hook free of said rope and adapted to hook around an external object.

7. The fitting according to claim 6 wherein said serrations are provided on said adjacent opposed surfaces of said first and second arms, whereby the grasping of a rope wedged therebetween is further enhanced.

8. The fitting according to claim 6 wherein said serrations are provided on said adjacent opposed surfaces of said third arm and said shank, whereby the grasping of a rope wedged therebetween is further enhanced.

9. The fitting according to claim 6 wherein said third arm is located adjacent to the side of said shank opposite the direction toward which said hook curves.

10. The fitting according to claim 6 wherein said fitting is formed from nylon.

* * * * *